United States Patent
Gold et al.

(10) Patent No.: US 6,785,786 B1
(45) Date of Patent: Aug. 31, 2004

(54) DATA BACKUP AND RECOVERY SYSTEMS

(75) Inventors: Stephen Gold, Bristol (GB); Jon Bathie, Bristol (GB); Peter King, Bristol (GB); Ian Peter Crighton, Bristol (GB)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/486,439
(22) PCT Filed: Aug. 28, 1998
(86) PCT No.: PCT/GB98/02603
§ 371 (c)(1), (2), (4) Date: Feb. 28, 2000
(87) PCT Pub. No.: WO99/12098
PCT Pub. Date: Mar. 11, 1999

(30) Foreign Application Priority Data

Aug. 29, 1997 (EP) ............................................. 97306628
Aug. 29, 1997 (EP) ............................................. 97306629

(51) Int. Cl.[7] ............................................. G06F 12/16
(52) U.S. Cl. ............................... 711/162; 714/6; 714/4
(58) Field of Search .................................. 711/162, 104, 711/114, 161; 714/6

(56) References Cited

U.S. PATENT DOCUMENTS

| | | | | |
|---|---|---|---|---|
| 5,644,698 A | * | 7/1997 | Cannon | 714/6 |
| 5,649,152 A | * | 7/1997 | Ohran et al. | 711/114 |
| 5,673,381 A | * | 9/1997 | Huai et al. | 714/1 |
| 5,673,382 A | * | 9/1997 | Cannon et al. | 714/6 |
| 5,758,359 A | * | 5/1998 | Saxon | 707/204 |
| 5,799,147 A | * | 8/1998 | Shannon | 714/6 |
| 5,966,730 A | * | 10/1999 | Zulch | 711/162 |
| 6,035,412 A | * | 3/2000 | Tamer et al. | 714/6 |
| 6,148,412 A | * | 11/2000 | Cannon et al. | 714/6 |

FOREIGN PATENT DOCUMENTS

| | | |
|---|---|---|
| EP | 0 410 630 A2 | 1/1991 |
| EP | 0 541 281 A2 | 5/1993 |
| EP | 0 769 741 A1 | 4/1997 |

* cited by examiner

*Primary Examiner*—Matthew Kim
*Assistant Examiner*—Matthew D. Anderson

(57) ABSTRACT

Clients are connected via a LAN to backup apparatus including hard and tape drives, respectively primary and secondary backups. Each client schedules backup operations on a time basis since last backup, the amount of information generated since last backup, etc. Prior to a backup, each client sends to the backup apparatus a request including information representing the files to be backed up. The backup apparatus receives backup requests from the clients and accepts or rejects backup requests based on backup and network loading. The backup apparatus eliminates redundant files and indicates to the clients, prior to the file back up, that some files requested to be backed up are already stored and are not to be sent. The backup apparatus enables a client to restore any of its 'lost' data by copying it directly from the disk, without the need for backup administrator assistance.

29 Claims, 9 Drawing Sheets

Figure 7a

| | | Date/Time | 1 | 2 | 3 | 4 | 5 | 6 | 7 | 8 | 9 | ... | n | Signature | |
|---|---|---|---|---|---|---|---|---|---|---|---|---|---|---|---|
| File 1 | Filename | Date/Time | 1 | 2 | 3 | 4 | 5 | 6 | 7 | 8 | 9 | ... | n | Signature | Modified |
| File 2 | Filename | Date/Time | 1 | 2 | 3 | 4 | 5 | 6 | 7 | 8 | 9 | ... | n | Signature | Modified |
| File 3 | Filename | Date/Time | 1 | 2 | 3 | 4 | 5 | 6 | 7 | 8 | 9 | ... | n | Signature | UnModified |
| File 4 | Filename | Date/Time | 1 | 2 | 3 | 4 | 5 | 6 | 7 | 8 | 9 | ... | n | Signature | New (Common) |
| File 5 | Filename | Date/Time | 1 | 2 | 3 | 4 | 5 | 6 | 7 | 8 | 9 | ... | n | Signature | New (Unique) |

Figure 7b

| | CRC |
|---|---|
| File 4 | CRC |
| File 5 | CRC |

Figure 7c

| | Filename | Signature | Pointer |
|---|---|---|---|
| File 4 | Filename | Signature | Pointer |

Figure 7d

| | | Date/Time | | | | | | | | | | | n | Signature |
|---|---|---|---|---|---|---|---|---|---|---|---|---|---|---|
| File 1 | Filename | Date/Time | | | 3 | | | | 7 | | | | | Signature |
| File 2 | Filename | Date/Time | | | | | | 6 | | | | | | Signature |
| File 4 | Filename | Date/Time | | | | | | | | | | | | Signature Pointer |
| File 5 | Filename | Date/Time | 1 | 2 | 3 | 4 | 5 | 6 | 7 | 8 | 9 | ... | n | Signature |

DATA BACKUP AND RECOVERY SYSTEMS

TECHNICAL FIELD

The present invention relates to computer data backup and recovery and particularly, but not exclusively, to apparatus, methods and systems for enacting data backup and recovery.

BACKGROUND ART

Typically computer networks in use today have the basic topology shown in the diagram in FIG. 1. In FIG. 1, several client workstations are connected via a network to several servers.

Users perform work on the client workstations that can communicate via a network link with the servers. Clients typically store unique user data whereas servers typically provide a common central point for some function such as shared hard disk storage, data backup storage, software applications or printer control.

There are a number of current schemes used for backing up data on the network. A first scheme is for each client to individually store data to a device such as a tape drive. Tape storage has become the preferred method of backing up information on computers due to its relatively low cost, high capacity, durability and portability. This first scheme requires each person, or each administrator, responsible for a client to be responsible for backing up the data. Also, each client requires its own backup device. A second scheme is for each client to store important data on a remote file server, where the server data is backed up at regular intervals, for example on a daily basis. Thus, if a client fails, potentially only less important information is lost. A third scheme, which is available, for example, to systems which operate under Windows NT4 and are part of an NT Domain, is that all 'specified' information on a client is backed up, typically overnight, to a tape drive connected to an NT server.

Known backup schemes offer relatively good protection for client data, but with a very high administration overhead. For example, if data needs to be recovered by a client, for example as a result of one or more files being 'lost' or destroyed, then the client's owner typically needs to contact an administrator of the backup system and request a restore procedure. Typically, a restore procedure involves the backup system administrator tracking down and mounting a respective tape, on which the last backup of the lost file(s) was made, and initiating the restore procedure. While such a procedure is typically very reliable, it can be perceived as onerous on client users and backup system administrators alike.

DISCLOSURE OF THE INVENTION

In accordance with a first aspect, the present invention provides tape storage apparatus, comprising:

interface means for connecting the apparatus to one or more clients;

controller means for controlling the apparatus and for processing messages received from the one or more clients;

primary storage means; and tape storage means, wherein the controller is programmed:

to process backup and restore messages received from the one or more clients respectively to backup to the primary storage means data received from the clients and to restore to said clients data from the primary storage means; and to backup to the tape storage means, in accordance with pre-defined criteria, at least some of the data stored in the primary storage means and to restore to the primary storage means, in accordance with a respective restore message received from a client, at least some data stored in the tape storage means.

Preferably, the controller means is programmed to maintain stored on the primary storage means at least the most current version of all data received from the clients. In this way, a data restore operation can be enacted using data stored in primary storage, without needing to find and install any particular backup tape.

Preferably, the controller means is programmed to backup data stored in the primary storage means to the tape storage means independently of any messages from the clients.

In preferred embodiments, the primary storage means comprises a random access storage means such as a hard disk drive. Alternatively, the primary storage means comprises non-volatile random access memory (NV-RAM). For the latter case, however, the applicants believe that currently NV-RAM would be very prohibitively expensive compared to a hard disk drive.

In preferred embodiments, the tape storage apparatus comprises a housing configured specifically to house the controller, the interface means, the primary storage means and the tape storage means. Thus, the tape storage apparatus provides a dedicated and integrated solution to data storage and recovery. In other, less preferred embodiments, the components of the apparatus may be distributed, for example, with some of the components residing on or in other apparatus, such as a computer.

In accordance with a second aspect, the present invention provides a method of backing up to a data backup and restore apparatus attached to a network data stored in one or more clients also attached to the network, the method comprising the data backup and restore apparatus storing in primary data storage a most recent version of all data received from the clients and, from time to time, in accordance with pre-determined criteria, storing in secondary data storage at least some of the data stored in the primary data storage.

In accordance with a third aspect, the present invention provides a data storage system comprising:

a network;

tape storage apparatus; and at least one client connected to the apparatus, the (or the at least one) client comprising client storage means and client processing means, the client processing means being programmed in accordance with pre-determined criteria to determine when data stored in the client storage means should be backed up to the tape backup apparatus.

Other aspects and embodiments of the invention will become apparent from the following description and claims.

BRIEF DESCRIPTION OF THE DRAWINGS

An embodiment of the present invention will now be described in more detail, by way of example only, with reference to the following drawings, of which:

FIG. 7 is a diagram which illustrates file information gathered during the procedure described in relation to FIG. 6;

BEST MODE FOR CARRYING OUT THE INVENTION, & INDUSTRIAL APPLICABILITY

As has already been discussed, hitherto known backup schemes and systems offer relatively good protection for network data, but with a potentially very high administration overhead, particularly when data restoration from tape is required. Administrators have the added problems of backups not being run, or failing due to lack of training or knowledge on the part of the client users. This is especially true of backup scheduling, media handling and maintenance schemes, such as tape rotation or drive cleaning. Failed backups can result in data loss, which, at best, causes time to be lost in recreating the data.

Also, as the amount of networked data increases, backup capacity and network bandwidth become significant limiting factors (takes longer to backup and thus increases network down time during backup), as does the increasing amount of backup administration overhead.

Consider a 10-client and 2-server network where each client has 2 Gbytes of disk storage and each server has 20 Gbytes of disk space. A tape storage device would potentially need to have a capacity of 60 Gbytes to guarantee to completely back up the network.

Further, a typical 10-Base-T network can transfer at most 1 Mbyte of data per second. A full backup of the above network would take 60,000 seconds or 17 hours. During this time, the network would be unavailable for use for any other means. This would be unacceptable to most users.

The embodiments described herein aims to address at least some of these issues.

Figure 1:
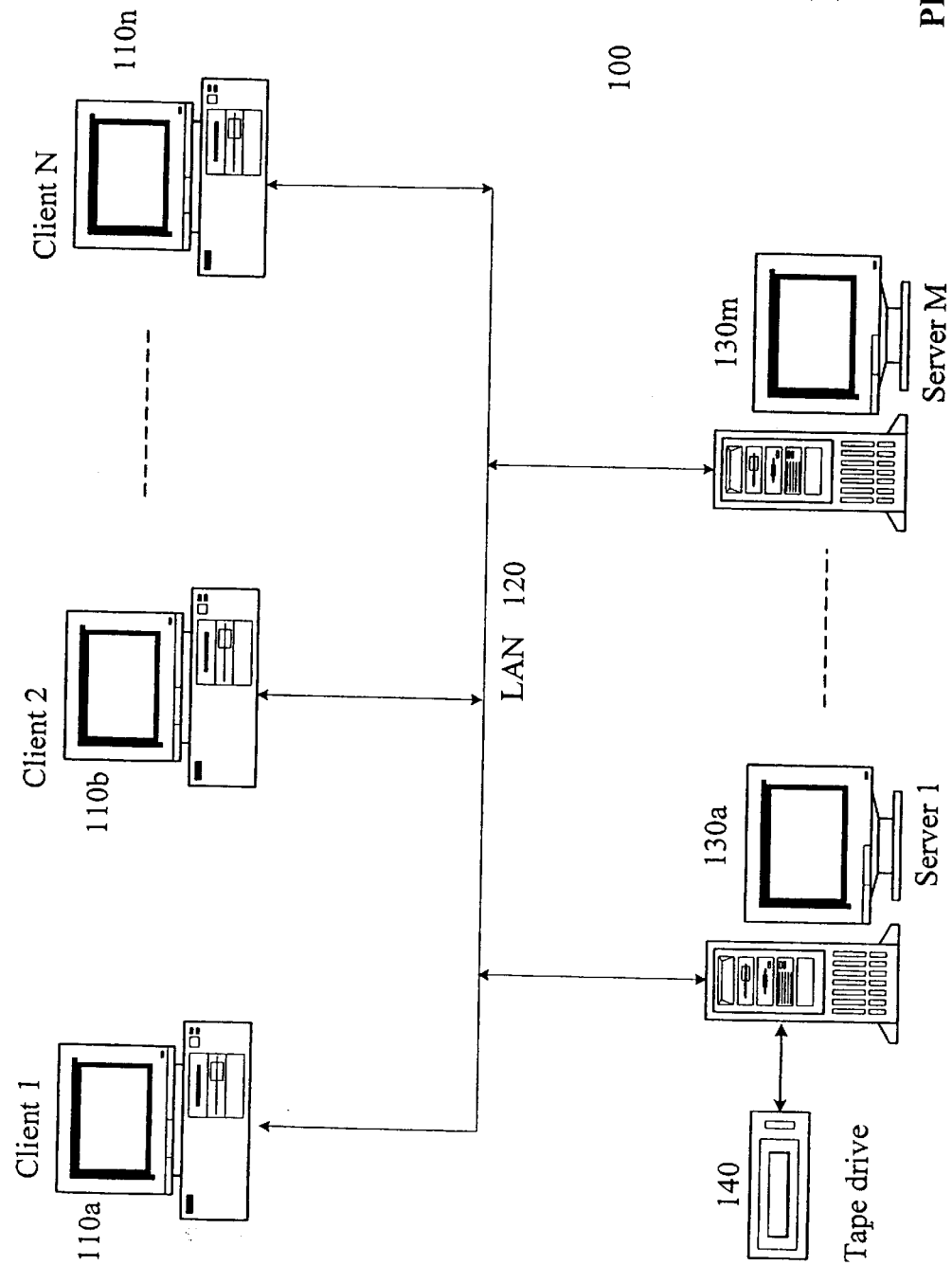
FIG. 1 is a diagram of a conventional computer network.

FIG. 1 is a diagram, which illustrates a general prior art networked computer environment 100. As shown, a plurality of computer systems, or clients, (designated 110a, 110b, etc) are connected to a computer network 120. In this example, the network is a LAN (local area network), such as an Ethernet, which supports the TCP/IP data communications protocol. Also connected to the LAN are a number of servers (designated 130a, 130b, etc). The servers may be, for example, file servers, print servers, email servers, or any combination thereof. In the diagram, a tape drive 140 is illustrated connected to the server 130a, where the server 130a is a file server. The data stored on the file server 130a, in on-line storage (where on-line indicates that the storage is accessible at a given instance) such as a hard disk drive, is backed up to the tape drive 140 on a daily basis, typically to a new tape each day. Tape media is termed off-line storage, since when a tape is removed it is no longer accessible. A backup operation is scheduled and controlled by backup software, which runs as a background process on the file server 130a. The backup software schedules the backup to happen at, for example, 11:00 pm each night, and controls the transfer of data from the file server 130a to the backup apparatus 900.

Figure 2:
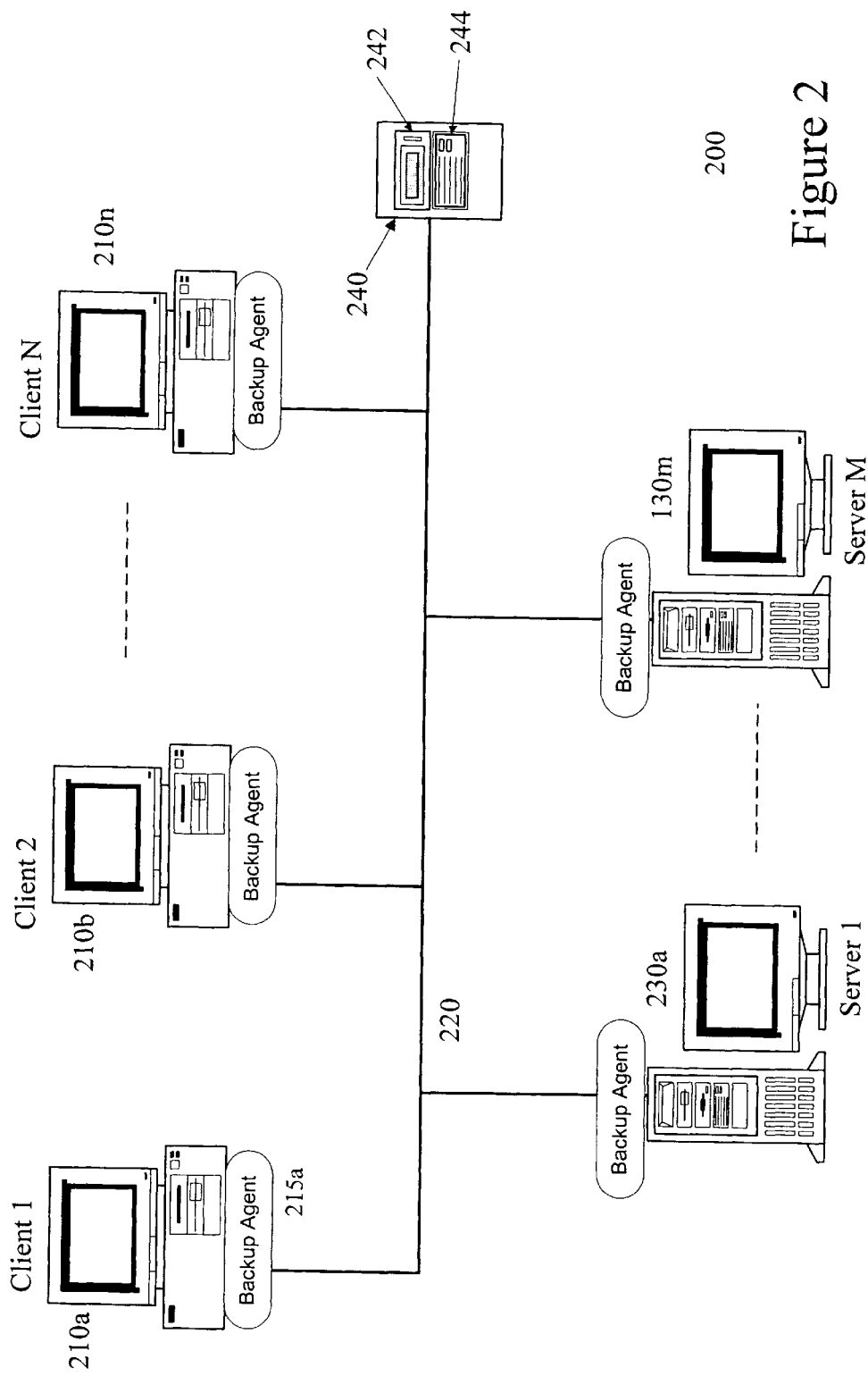
FIG. 2 is a diagram of a computer network modified to operate in accordance with the present exemplary embodiment.

FIG. 2 is a diagram, which illustrates a networked computer environment 200 modified for operation according to the present embodiment. As shown, a plurality of clients (designated 210a, 210b, etc) are connected to a computer network 220. In this case also, the network is a LAN (local area network), such as an Ethernet, which supports the TCP/IP data communications protocol. A number of servers (designated 230a, 230b, etc) are connected to the LAN 220. The servers, as above, may be file servers, print servers, email servers, or any combination thereof. Also connected to the LAN 220 is a backup apparatus 240 according to the present embodiment. The backup apparatus 240 is shown to include a hard disk drive 244 in addition to a tape drive 242. The operation of the backup apparatus 240 will be described in more detail below.

In general terms, servers can be thought of as more powerful clients, or clients with large amounts of disk storage. Thus, for the sake of convenience and unless otherwise stated, the term "client" when used hereafter shall be taken to mean either a server or a client in a network environment. Further, for ease of description only, the term "client" shall also be taken to include any device or apparatus which stores data locally which can be backed up remotely.

Further, unless otherwise indicated, only one client system 210a will be considered, although it will be understood that the other clients operate in the same manner.

The client 210a includes a backup agent 215a, which comprises one or more software routines. The main functional modules of the backup agent 215a are illustrated in the diagram in FIG. 3. Each module comprises one or more software routines, written for example in the C++ programming language, which control the client 210a to process data and communicate with the backup apparatus 240 as described in detail below. The software routines are stored on a hard disk drive device (not shown) in the client and are loaded into main random access memory (RAM) when they are required to operate, and a central processor in the client processes the instructions to control the client to operate in accordance with the present embodiment. The lines illustrated interconnecting the various modules and diagram blocks represent communications channels which are open some or all of the time, depending on requirement. The client 210a is a general purpose computer, such as a PC running the Windows NT 4.0 operating system.

Dynamic Scheduler Module

Figure 3:
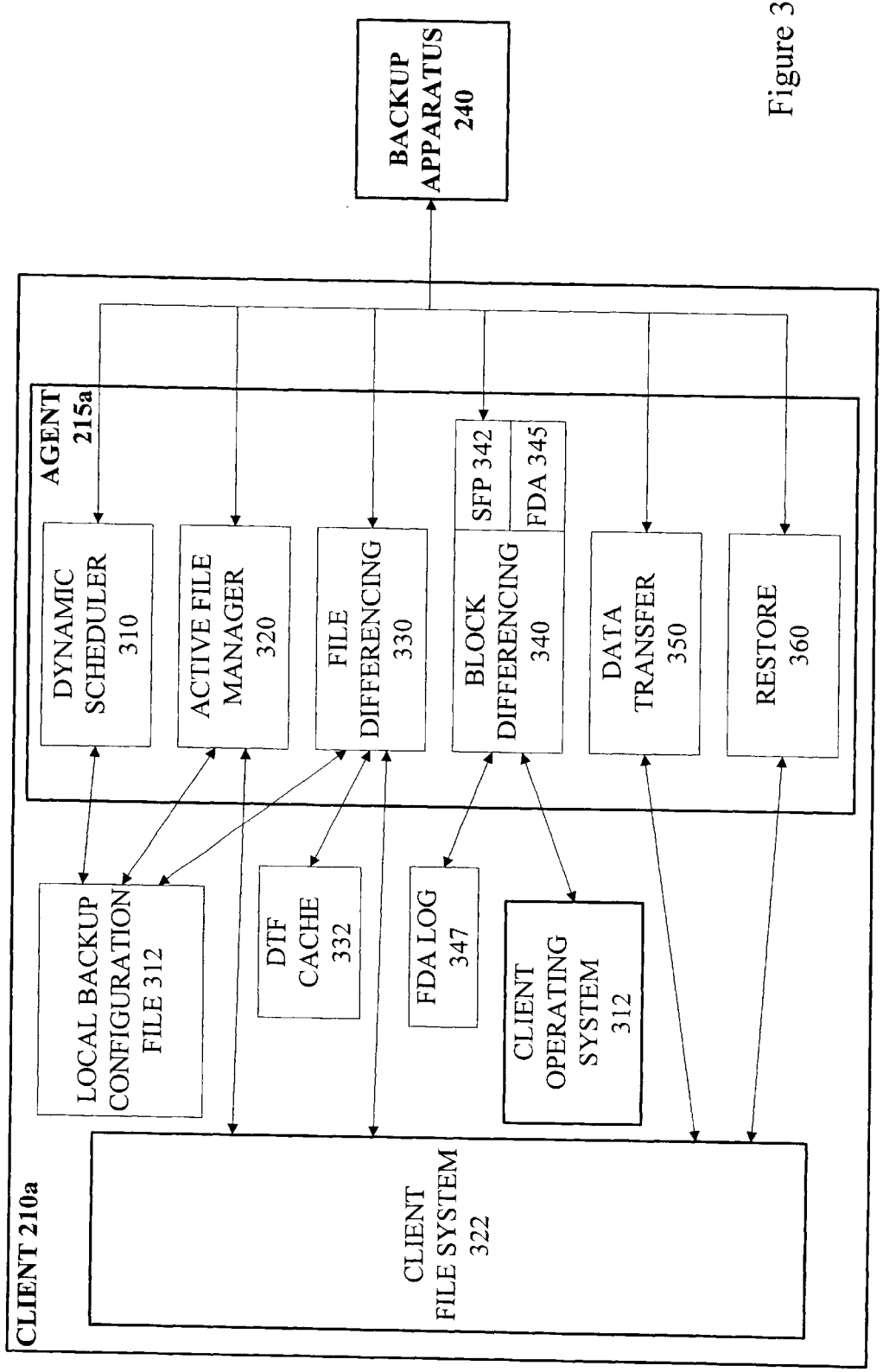
FIG. 3 is a diagram illustrating the main functional features of a client according to the present exemplary embodiment.

In FIG. 3, a dynamic scheduler 310 is a module responsible for dynamically initiating a backup cycle from the client 210a, based on time since the last backup and the local system resources. A local backup configuration file 312 contains details on a general network-wide policy set by the network administrator and a local user-defined policy, in terms of a target time delay before data is protected. For example, one default policy would be to attempt a backup once an hour. The dynamic scheduler 310 is a background process which runs permanently on the client 210a.

After the target time delay (e.g. 1-hour) has passed, the scheduler 310 assesses the local client system 210a resources to ensure that the backup can run without seriously impacting the system performance. If the local client system 210a is heavily loaded, for example at 95% capacity, the scheduler 310 will retry a short period later (e.g. after 5 minutes) and continue retrying until the system has enough free resources to run the backup. There is an upper time limit to the retry, for example 30-minutes, after which time a backup is forced irrespective of system loading. The upper time limit for retrying is another general policy variable stored locally in the backup configuration file 312.

Once the local client system resources allow, the scheduler 310 communicates with the backup apparatus 240 to request a backup slot. The backup apparatus 240 will allow the backup job to start if the network bandwidth can support it. If there are already other backups running from other clients, which are using up all of the network bandwidth allocated to backups, the backup apparatus 240 communicates with the client 210a to refuse the request. As a result, the scheduler 310 returns to the retry cycle and waits until the backup apparatus 240 gives permission to progress.

Because the backup agent 215a dynamically initiates the backup jobs, the overall network backup scheme is configuration independent. Thus, a client can power-save, or a portable client can be detached from the network, and on return the backups can continue seamlessly. Thus, there is no requirement for the backup apparatus 240 to have any 'knowledge' of which clients are connected, or are not connected, to the network at any time.

The dynamic scheduler 310 also has responsibility for initiating the operation of the other modules when required.

Active File Manager Module

An active file manager module (AFM) 320 monitors which files are to be opened by the backup agent 215a, for the purpose of backing up. Before a file is opened, the AFM 320 checks the client's file system 322 to see if the file is already in use by another program running on the client 210a. If the file is already in use, the AFM 320 waits until the file is in a "safe" state for the backup agent 215a to back it up. Only when the file is "safe" does the AFM 320 allow the backup agent 215a to open the file. A file can be "safe" even if the file is locked and in use. If the file is written to during the backup operation, the AFM 320 automatically preserves the data to be backed up by sending the respective blocks directly to the backup apparatus 240 over the network. The backup apparatus 240 can then manage or re-order these out of order backup blocks, thus preserving the original state of the file from when the backup started.

For example, consider a database of customer addresses (not shown), which is being backed up. During the backup, a user changes one of the entries in a part of the database that has not yet been backed up. The AFM 320 immediately sends the old address to the backup server, and when the backup reaches this point it skips the updated address in the database. This method means that when a database application thinks it has written data to disk, it has indeed been written to disk, and not cached somewhere else. Thus, there is no possibility of data loss or corruption if the server 240 were to crash during the backup.

The AFM 320 can be user-configured to determine when a file is "safe" to backup. For example, the AFM 320 can use a write inactivity period to decide this, which would be one of the general policy values stored in the backup configuration file 312. In order to ensure that a backup copy of a file does not contain a partial transaction, the AFM 320 monitors the period of time that passes without a write taking place. For example, if the time is set to 5 seconds, the file is not "safe" until there is a 5 second period when there are no writes active, and at this point the file can be backed up. There is also a value for the period of time after which the AFM 320 gives up trying to find a safe state. For example, if this time is set to 60 seconds, then the AFM 320 will try for one minute to find a 5 second period with no writes.

Some applications, notably databases, operate a number of files simultaneously (e.g. data files and index files) and to assure the overall integrity of such files they must be configured as a "group". A group defines a number of files that must be backed up from a collective "safe" state, and only when every file in the group is simultaneously in a "safe" state can each file be backed up. This grouping is performed automatically by the AFM 320 when it detects one of the major database types (e.g. Exchange, Notes, SQL Server, and Oracle). Further, the AFM 320 may be configured to treat user-defined list of files as groups, with the group definitions being stored in the backup configuration file 312.

File Differencing Module

A file differencing module (FDM) 330 is a module in the backup agent 215a that selects the files to be backed up by determining which files have changed or been added since the last backup. The module achieves this by reading the current directory tree of the local file system 322 and checking each file's modified time/date against the entries in a cached Directory Tree File (DTF) 332 generated from the last backup. Modified files will have different times and dates, and new files will have no corresponding entry. Modified files are marked as "Modified" and new files are marked as "New". Note that for the first backup after installation all files will be new files.

Before the list of modified or new files is further processed, the list is filtered for excluded files (such as temporary files, Internet cache files, swap files, etc). The policy for excluding files is held in the local backup configuration file 312, and is generated from a general network policy set by the network administrator and also from a user-defined set of excluded files or directories.

The next stage is to determine which of the new files are already held on the backup apparatus 240, and are thus redundant. For example, if there has already been a backup of a Windows95 workstation, then subsequent backups will determine that the Windows95 operating system files are redundant. The FDM 330 first sends the list of the selected new files to the backup apparatus 240. The list contains for each file a 32-bit CRC code (calculated for the respective name, date/time stamp and file size information). The backup apparatus 240 returns a list of the files that match its existing backup file contents, and for each file it also returns a signature (in this case a 32-bit CRC checksum calculated over the actual file data) and an indication of the location of the file on the backup server. For each of the potentially redundant files in the list, the FDM 330 generates a respective signature value and compares it with the value returned by the backup apparatus 240. Where the signatures match, the file marking is changed from "New" to "Redundant". Thus, the output of the FDM 330 is a list of all files which are new or modified since the last backup, marked as:

"Redundant", copy already held on backup server;

"New", new file, thus no need for block differencing; or

"Modified", use block differencing to determine which blocks changed.

As well as files, the FDM 330 identifies any modifications to the system information used to rebuild the system in disaster recovery. This covers areas such as NetWare NDS partitions, disk partition information, file system types and details (e.g. compressed), bootstrap partitions (e.g. MBR, NetWare DOS partition).

Block Differencing

A block-differencing module (BDM) 340 determines which blocks in each file have changed since the last backup. The process of identifying the changed portions (deltas) of files is performed by two basic processes. The first process is a sliding fingerprint (SFP) process 342. In general, a fingerprinting process is a probabilistic algorithm, where the probability of a failure is made far less than the probability of an undetected failure of the underlying storage and communication media (for further, detailed information on fingerprinting, the reader is referred to the book by Richard Karp and Michael Rabin, "Efficient randomised pattern matching algorithms", Harvard University Centre for Research in Computing Technology, TR-31-81, December 1981). The second process involves active detection of writes to regions of files; this technique requires a process called a file delta accelerator (FDA) process 345. The FDA process 345 is a background process which operates all the time to monitor the client's operating system 312 write calls and maintain a log 347 of which logical regions of which files have been modified.

The FDA process 345 is more efficient for files that are updated in place (e.g. databases), while the SFP process 342 is far more efficient for document files that are entirely (or largely) rewritten with each update—although, only a small portion of the file may have been modified. As will be described, the present embodiment makes use of a combination of an SFP process 342 and a FDA process 345. As each modified file is opened for backup, the FDA process log 347 is checked to see how much of the file has been modified. If more than a threshold percentage, for example 5–10 percent, has been modified, and if the absolute size of the changes is smaller than a given size (e.g. 2 MB), then the SFP process 342 is selected as the appropriate process to use. Otherwise, the FDA-detected regions are used. Note that if the local client 210*a* crashes without a 'clean' FDA shutdown, all FDA log 347 information is totally invalidated, so the BDM 340 must temporarily revert to the SFP process (or a conventional incremental backup) when the next backup is performed.

The SFP process 342 divides an updated file into equal-sized "chunks", the size of which varies depending on the file size. Each chunk has a 12-byte fingerprint calculated for it, and the fingerprints are sent with the backup data for the file to be stored by the backup apparatus 240. When a file is to be checked with the SFP process 342, the BDM 340 communicates with the backup apparatus 240 to download the fingerprint set for the file in question. It is also possible to locally cache fingerprint sets for files that are frequently accessed. The SFP process 342 then calculates the fingerprint function for the updated version of the file, starting from the first byte and using a chunk size the same size as for the last backup of the file. Then the SFP process 342 compares the resulting new first fingerprint with the previous fingerprint set to a find a match. If there is a match, then the chunk starting at that byte is already present on the backup apparatus 240, and thus need not be backed up. If there is no match, then the fingerprint function calculation is repeated but starting at the next (second) byte, and so on.

For all files that are "Modified", the block differencing process is performed as described above, producing a stream of modified chunks (plus new fingerprints) for each file. For "New" files there is no need for block differencing, so the entire file is broken up into chunks (the initial chunk size depends on the file size) with a new fingerprint being calculated for each chunk. All these file chunks (plus new fingerprints) are sent to a data transfer module 350, described below in more detail, to be compressed and sent to the backup apparatus 240.

Data Transfer Module

A data transfer module (DTM) 350 performs the actual transfer of the backup data from the backup agent 210*a* to the backup apparatus 240. As chunks of backup data (plus fingerprints) are received from the BDM 340, they are compressed and added to a backup stream of data for transfer to the backup apparatus 240. There is a delay between the transfer of each chunk due to the times taken to obtain the chunk and compress it, and the need to limit the client backup transfer data rate. This method breaks the backup stream into small discrete pieces, thus making it less network bandwidth intensive. The selected data transfer rate and delay is determined by the backup apparatus 240, as will be described.

All the differences in all the changed files since the last backup are stored in backup directory files (BDFs). BDFs also contain a fingerprint for each respective file chunk, and RFE index information (date/time stamps, signatures, etc) for each changed file, which will be described below.

All backup data is indexed so that it can be reconstructed from the various BDFs on the backup apparatus 240. Pointers to areas of the various BDFs are used for reconstruction purposes, and these pointers are held in the DTF, which indexes all the files on the backup apparatus 240.

Figure 4:
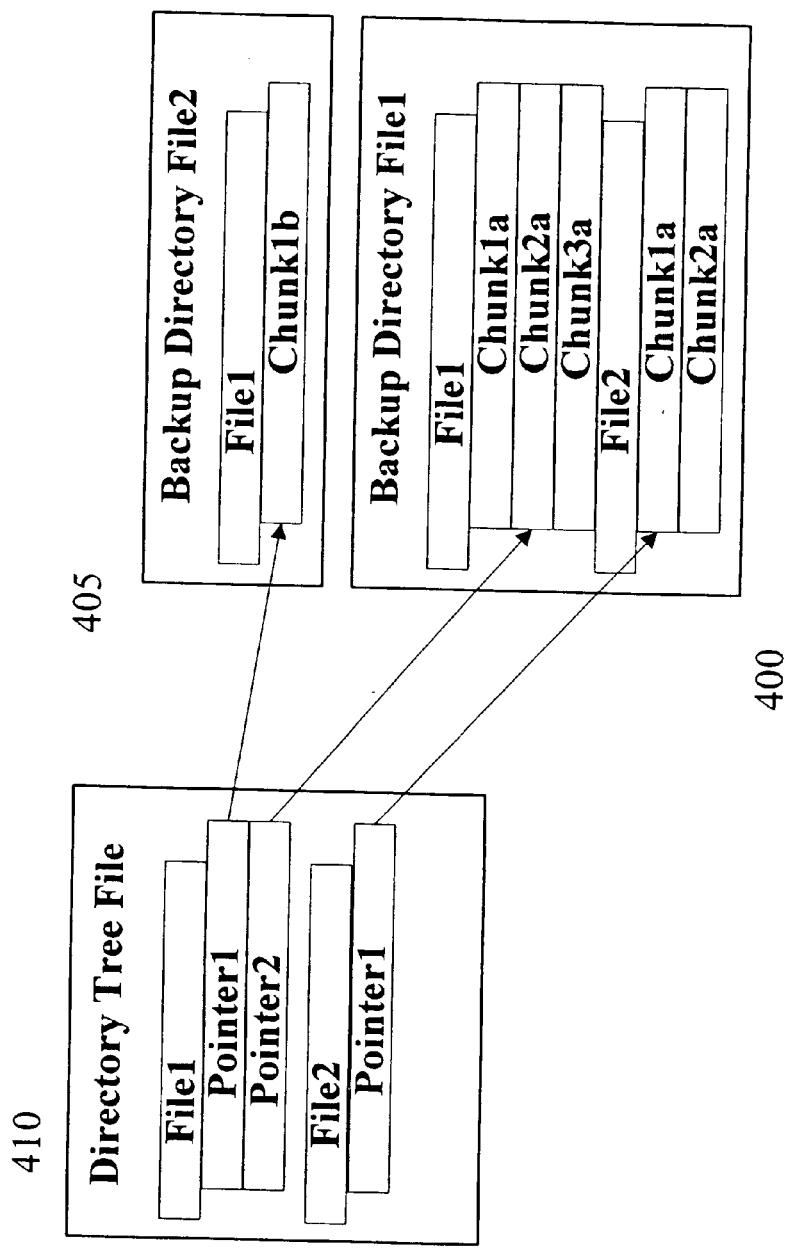
FIG. 4 is a diagram which illustrates the main file structures on the tape backup apparatus to facilitate a backup operation according to the present exemplary embodiment.

An exemplary DTF and associated BDFs, BDF1 and BDF2, are illustrated in FIG. 4. For example, with reference to FIG. 4, consider the scenario in which a file, File1, was originally backed up in BDF1 400, and then the first chunk, Chunk1*a*, was modified and was stored in BDF2 405, as Chunk1*b*. Then, the entry in the DTF 410 has a pointer, Pointer1, to BDF2 for the first chunk, Chunk1*b*, and also a pointer, Pointer2, to BDF1 for the unchanged chunks, Chunk2*a* and Chunk3*a*, of the file. Thus, for a restore operation of File 1, File 1 comprises Chunk 1*b* (in BDF2) and all chunks from Chunk 2*a* (in BDF1).

For "Redundant" files, the entry in the DTF 410 is a copy of the pointer(s) to the already existing copy of that file on the backup apparatus 240.

Every time a backup is performed, a new DTF is generated. The new DTF is sent to the backup apparatus 240 and also cached to the local client system. Since only a small number of files will typically have changed since the last backup, the new DTF can use pointers to the previous DTF for those parts of the directory that are unchanged.

Restore Module

A restore module 350, performs restore operations using the DTFs to generate a directory tree of all files that can be restored. The restore module 330 can either use the local cached copies of the DTFs (for recent views) or download other ones from the backup apparatus 240 (for older views). If the restore is being performed from a mounted tape (e.g. a historical archive) in the backup apparatus 240, then there will be a complete second set of DTFs to provide an alternate historical restore view. Any restore from tape media, rather than hard disk drive device, would be much slower.

Since the DTF generated for every delta backup is a (virtual) complete list of all files, the user can change the restore view to an earlier backup and restore an older copy of a file. By default, the initial restore tree is from the latest backup.

When a user selects to restore a specific file from a specific backup, the DTFs are used to identify which portions of which BDF contain the file data. This data is then copied from the backup apparatus 240 to the backup agent 215*a*, decompressed, and written to the specified location in the client storage.

A directory tree of all files which can be restored is generated and viewed in a graphical user interface, for example an extension to the Windows Explorer program available on Microsoft Windows 95 and Windows NT4. This provides a familiar and easy to use environment for users to restore their backup data. This process covers restoration from the local client 210a. However, this does not apply to server data, particularly for NetWare, which does not have a graphical console. In this case, the server data restore tree would need to be available through a remote workstation console (not shown). There are two methods by which this could be done:

- if a user logs in as a backup administrator in the tape backup apparatus administration interface, then display ALL server volumes for restore; or
- alternatively, use the configured server drive mappings to indicate which server volumes to display in the restore directory tree. File security information stored in theB-DFs is used to filter the restore tree based on the user security used for each server drive mapping.

Tape Backup Apparatus

According to the present embodiment, the backup apparatus 240 functionally comprises a set of modules each consisting of one or more control programs. The programs may comprise software routines, written for example in the C++ programming language, but preferably comprise firmware stored in non-volatile memory such as read only memory (ROM), or hardware comprising application specific integrated circuits (ASICs). In the present embodiment, the backup apparatus 240 is in the form of a dedicated, networked appliance, as will be described below in more detail with reference to FIG. 9.

The backup apparatus 240 comprises two-levels of data storage for backup data. The first level of data storage is on-line, random access storage, in the form of a hard disk drive 244, of sufficient capacity potentially to at least store all data from all local client storage. From this hard disk drive 244, any client can restore any of its most recently backed up files or whole file system, without having to address any tape storage. Hitherto, tape backup systems known to the applicants rely on tape backup as the first, and typically only, level of backup. The second level of storage comprises off-site, off-line tapes, which are removed from the backup apparatus 240 by the system administrator. Data on a tape can be accessed by a client once the tape has been re-loaded mounted into the backup apparatus 240, since the tape can be 'mounted' as a volume of the file system of the backup apparatus 240. Of course, data recovery from tape will always take longer than data recovery from on-line storage.

The backup apparatus 240 according to the present invention provides extremely convenient access by a client to recover one or more lost files, which have been backed up, without the need to find an archived tape. Typically, tape-based backup systems use a different tape for each day of the week, and thus require use of a particular tape for the day on which the data was last backed up to restore any data which has been lost. This means that generally tape-based backup systems must regularly (e.g. once a week) repeat a full backup of all data (including unchanged file that have already been backed up) to prevent needing an unmanageable number of tapes to restore a file or system. The present backup apparatus 240 maintains in on-line storage 244 an instance of every backed up client file, and any or all files can be restored at any time by a client-initiated process. This also means that there is no longer any need to repeat a backup of unchanged files—only the changes are sent after the first backup.

Figure 5:
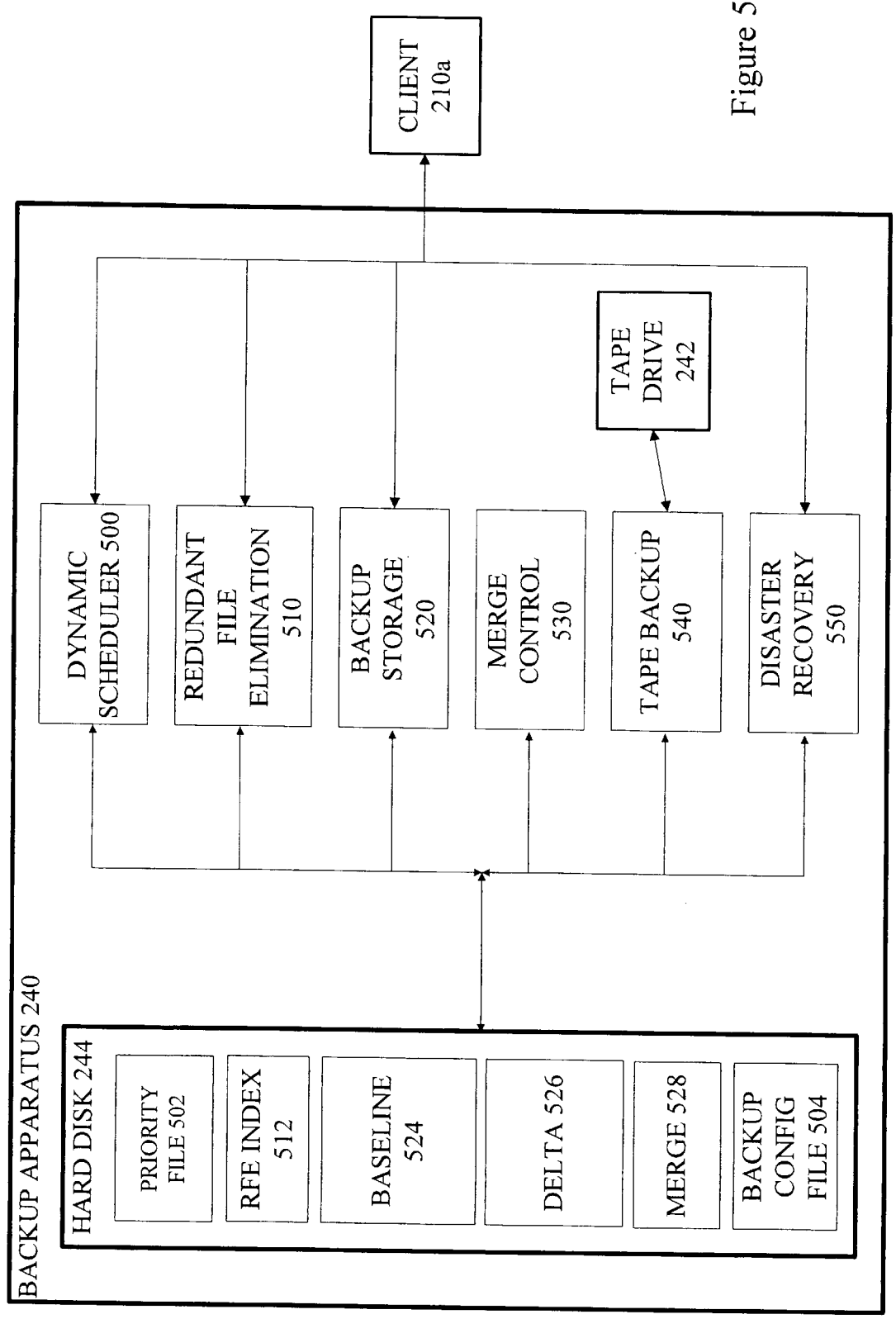
FIG. 5 is a diagram illustrating the main functional features of a backup apparatus according to the present exemplary embodiment.

The major functional modules in the backup apparatus 240 will now be described in association with the functional block diagram in FIG. 5.

Backup Dynamic Scheduler

A backup dynamic scheduler 500, or backup scheduler, for the backup apparatus 240, works in conjunction with the dynamic scheduler 310 in the client backup agent 215a. The role of the backup scheduler 500 is to control the flow of backup jobs in order to control the network bandwidth used by the backup data traffic.

The backup scheduler 500 varies the active jobs so that the amount of backup traffic over the network is 'throttled' (or restricted), and is kept within a defined bandwidth such as 5%. Thus, the backup traffic will be guaranteed never to use more than 5% of the network bandwidth. If there are too many backup jobs or too much changed data then the time to complete the backup jobs will extend. Thus the tape backup apparatus scheduling of the backup jobs may mean that data cannot always be protected within the target period (e.g. 1 hour). The parameters and their respective thresholds, which are used to determine whether a backup operation can be allowed, are stored in a backup configuration file 504. There are two basic methods that can be used to throttle the backup traffic:

1. Each backup agent transfers the backup data at a specified controlled rate (e.g. 50 KB/sec) by adding artificial delays between small backup data blocks. For example, a single client sending 16K blocks with 200 ms delays between blocks uses 5% of available network bandwidth for a 10 Mbit Ethernet.
2. Each backup agent, when it is active, bursts the backup data, aiming to complete the backup in a short time. However, the size of the backup data blocks needs to be limited (e.g. to 16K) so that the backup does not use all available network bandwidth. A single client streaming 16K blocks uses approximately 25% of the available network bandwidth, and two streaming clients use 45% etc. The throttling will then sequence the jobs, so that only a small number (e.g. 2) are active simultaneously, and add large delays between jobs so that the overall average bandwidth used is 5%.

The backup scheduler 500 also includes a prioritisation scheme based on the time jobs have been waiting to start, the estimated amount of data sent in each job, and the available network bandwidth. The prioritisation scheme variables are stored in a prioritisation file 502 on the tape backup apparatus 500. For example, if a backup request from a backup agent is refused due to insufficient network bandwidth, the time of the first refusal is logged, and subsequent requests are compared with other outstanding requests against the length of time since the first refusal. The job that has been waiting the longest will be started first. An adaptive algorithm in the backup scheduler 500 that 'learns' the average job size from the system, by averaging over all jobs received in a fixed time period of, for example, one week, can determine the estimated size of the jobs.

The backup scheduler 500 also adapts to the network conditions so that if the network consistently has much more than 5% available bandwidth, then the backup scheduler will sequence backup jobs to use more network bandwidth (e.g. 10%) during slack periods.

The tape backup apparatus administrator may configure the backup scheduler 500 to give priority to the backup jobs at the expense of the network bandwidth, in which case the job sequencing priorities are assigned based on the time since the last backup rather than network bandwidth.

Redundant File Elimination Module

Figure 8:
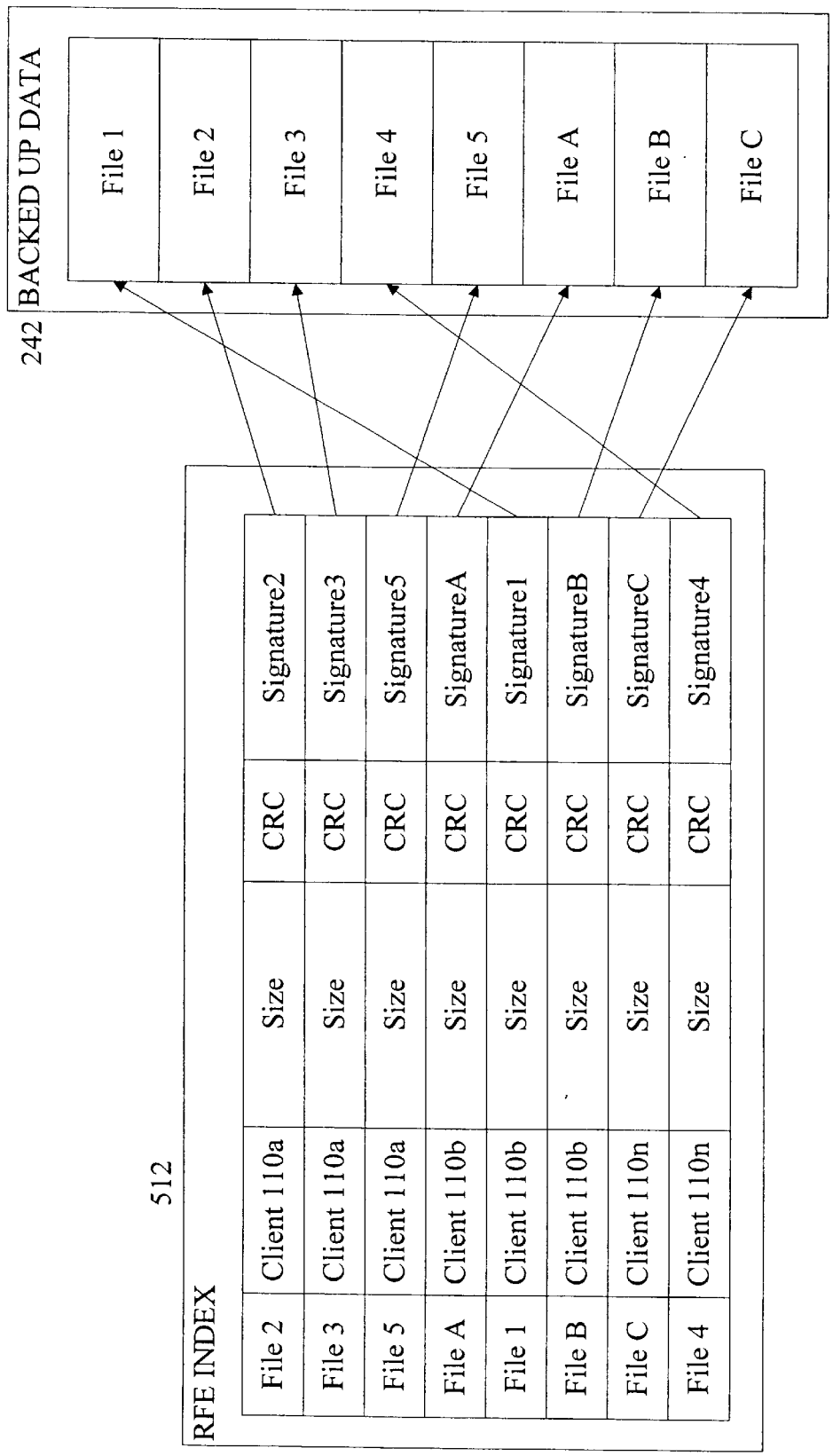
FIG. 8 is a diagram which represents a redundant file elimination index.

A redundant file elimination (RFE) module 510 maintains an index, the RFE index 512, in the backup apparatus 240. The RFE index 512 is a database which is either held in memory or on the hard disk drive 244, listing all the files held in the primary storage. The index 512 is used by the backup apparatus 240 to determine whether files requested to be backed up by the local client 215a are already backed up by another client and, therefore, do not need to be backed up again. The RFE index 512 holds a file record for each file stored. Each file record, as illustrated in FIG. 8, only takes approximately 28 bytes (4 bytes of file ID, 4 bytes of client ID, 8 bytes of file size, 4 bytes of CRC (calculated over the name/size/modified date and time stamp), 8 bytes of file signature), so that even with millions of files to store the RFE index memory requirements are not excessive.

The backup agent 215a sends to the backup apparatus 240 a list identifying new files to be backed up. The list only contains the four bytes of CRC for each file, where the CRC contains sufficient information to allow file comparison and identification. Using the CRC information, each file in the list is compared with entries in the RFE index 512 for a match. If any matches are found, the backup apparatus 240 returns a list of these files, plus their signatures and locations, as already mentioned above. The backup agent 215a compares the returned signatures with signatures generated for its local files to determine if the files are exactly the same.

Backup Storage Module

Each backup agent 215 sends its backup data and the most recent DFT to the backup apparatus 240 for storage by the backup storage module (BSM) 520. The backup data comprises the stream of file data to be backed up. A backup storage module 520 stores the files in on-line media such as one or more hard disk drives 244. The on-line media 244 is divided into logical areas, including:

Full area 524 (which holds the baseline full backup and the respective fingerprint data)

Delta area 526 (which holds changes since the baseline full backup and respective fingerprint data)

Merge area 528 (which is the workspace used during merge of changes into new baseline full backups)

The hard disk drive 244 also holds working files such as the prioritisation file 502 and the backup configuration file 504, and, where applicable, the RFE index 512. The baseline full backups in the full area 524 consist of a single backup data file and directory tree file for each client 215, and these are used as a baseline for the delta backup data. For example, if a delta is the first block of a file, then to restore this file the first block is obtained from the delta backup and the rest is obtained from the baseline full backup. The full backups are initialised when the first backup is performed on the client system. However, if the initial full backups were then left untouched, over time there would be an unmanageably large number of delta backups (which would impact storage space and restore time). Thus, there must be a regular update of the baseline full backups by merging the delta data into a new baseline full backup, as will be described below.

The delta area 526 contains the delta backups from each client. Delta backups also each comprise a backup data file and a directory tree file. Note that the directory tree files are themselves deltas on the baseline full backup directory tree file.

The merge area 528 is used for merge operations. At pre-determined regular intervals, for example every month, there is a space-saving operation to merge the oldest delta backups for each client into a new baseline full backup. Also, there are regular space-saving operations to merge the hourly delta backups for a 24-hour period into a single delta backup, as described below.

Merge Control Module

A merge control module MCM 530 is responsible for merging multiple delta backups together with either the baseline full backup or with other delta backups. The purpose of this is to reduce the amount of on-line capacity used by deltas, while maintaining a reasonable history of changes so that the user can restore files from up to at least a week ago. Without this merge function, there would be at least 10 deltas for each day (hourly backups).

The MCM 530 can be configured by the server administrator with merge criteria to suit the network environment. The criteria are stored in the backup configuration file 504. For example, keeping hourly backups would not be productive beyond one day. Therefore, one possible default criterion is to merge the last 24 hours' deltas into one daily delta, for example at 11:59 pm each day. Another possible scenario is for the MCM 530 to reduce the number of daily deltas, at the end of four weeks, by merging the oldest two weeks of deltas into a new baseline full backup. In this example, whenever the user requests a restore view, they have the capability to view hourly history for the current day and at least two weeks of daily history.

If the backup storage delta area 526 reaches a predetermined threshold, for example 95% capacity, the MCM 530 overrides the merge criteria and performs an immediate merge of the older deltas into the baseline full backup.

Another function of the MCM 530 is to delete files from the baseline full backup when they have been deleted from a respective client system and are older than a predefined, user-configurable period such as one month. The MCM 530 regularly (e.g. weekly) compares the directory tree files of the baseline full backup with the directory tree files of the delta backups. Since directory tree files contain a 'snap-shot' of all files present in the file system at the time, deleted files will be present in the full backup but not in any of the delta backups. After identifying any deleted files, if these files are older than a predefined period (e.g. one-month) then they are removed from the baseline full backup. In this way, the storage requirements of the baseline full backup are not dramatically increased by old deleted data. It is still possible to keep copies of old data in archives by using offsite tapes generated by a tape backup module.

A further feature of the MCM 530 is to detect when multiple pointers, from different clients, point to a single baseline file entry. In this case, a standard merge operation cannot occur, to merge a delta for one client with the baseline entry, otherwise the entry would be wrong for the other client(s). The means to overcome this, applied by the MCM, is not to merge the baseline entry with any deltas, unless all the deltas are the same. One alternative would be to carry out the merge for one client but modify the deltas for the other client. Another alternative would be create a new baseline entry for the other client(s) and then merge the delta with the baseline entry for the first-mentioned client.

Tape Backup Module

As already described, initially all the selected backup data is sent from the backup agents 215 to on-line storage (hard disk drive) 244 on the backup apparatus 240, and is available for immediate restore from that media. However, this does not provide a complete backup solution, as the backup data is still susceptible to a disaster since it may still be on the same site as the original data. Therefore, in accordance with the present embodiment, a regular copy of the tape backup apparatus data is made to removable storage (in this case tape), so that it can be taken offsite. The backup to tape step is made on the basis of pre-determined criteria independently of any message received from clients or elsewhere.

A tape backup module (TBM) 540 provides this capability. The TBM 540 copies the tape backup apparatus', on-line data on the hard disk drive 244 to tape media at a pre-determined customer-scheduled time and day/date. The TBM 540 copies a mirror image of the blocks of data on the hard disk drive 244 to tape. Such block-level copying allows large blocks of data to be read directly from the disk, rather than reading each file one at a time through the file system. This improves the data rate from disk to tape and thus ensures that the tape is kept constantly supplied (streaming) with data.

The tape backup operation necessarily runs while the backup apparatus 240 is still actively able to accept and manage backup data from the clients. For this reason, the TBM 540 incorporates active file manager technology, which is described above, to prevent backup corruption.

The backup administrator can schedule the generation of an offsite backup tape by specifying the day/date and the time of day they want the tape. This configuration information is stored in the backup configuration file 504. In other words, the administrator can configure the TBM 540 to produce a complete tape copy of all backup data at a convenient time, for example, to take the tape with them when they leave work at 5.30 pm each weekday. The TBM 540 calculates the start time of a tape backup based on the administrator's completion time, the amount of data held on the backup server, and data transfer rate of the tape backup apparatus.

The default offsite tape backup schedule is every weekday at 5.30 pm. If a tape is loaded in the drive at the start time of the backup, it will automatically be overwritten with a new full backup. At the end of the backup, the tape is automatically ejected from the tape backup apparatus so that it is clearly finished and ready to be taken away by the administrator.

Since deleted files more than one month old will be removed from the baseline full backup, the offsite tapes can be used as archive storage for such files. By saving an offsite tape at regular intervals (for example at the end of each week) the user can archive the backup data in case any old deleted files are ever required in the future. Also, there may be legal requirements to keep backup data for a period of years. There should be a configuration option to enforce this retention of offsite media for archive purposes, so that the regular tape backup will not automatically overwrite archived tapes.

Since the tape backup media may be used as archives, there must be a facility for the backup agent 215*a* to access an archive tape for restoring files. The way this is done is to mount the tape backup apparatus image on the tape 242 as a read-only disk volume, and thus provide access to the archived directory tree files and backup data files on the tape. To speed up the generation of the restore tree, the tape copies of the directory tree files can be copied onto the tape backup apparatus hard disk drive. After the archive tape is successfully mounted for restore access, the restore tree views in Windows Explorer provides an archive restore tree, as described above.

Disaster Recovery Module

When a client system 210*a* completely fails, the backup apparatus 240 can be used to restore the complete data environment onto a new replacement or repaired system. All of the files are held on the on-line storage 244 of the backup apparatus 240. A disaster recovery module (DRM) 550 recovers requested files from the baseline full backup for the client and any deltas. The new system must have the appropriate operating system installed, and then install the backup agent to communicate with the backup apparatus 240. The restore module 350 of a client is initiated by an administrator to communicate with the DRM 550 and copy back all of the data from the last backup (in effect a reverse RFE).

The DTFs on the backup apparatus 240 are used to determine the state of the system to be recovered. There are also options to select an older system state to restore for the disaster recovery by using previous delta versions of the directory tree files, which would be used if the latest state of the system were corrupted.

Due to the fact that large quantities of the data need to be transferred over the network to recover a complete system, there is also an option to schedule the disaster recovery operation. Since the recovery is performed from the on-line storage 244 in the backup apparatus 240, there is no user intervention required and the recovery can proceed unattended at any time.

Backup Operation

Figure 6:
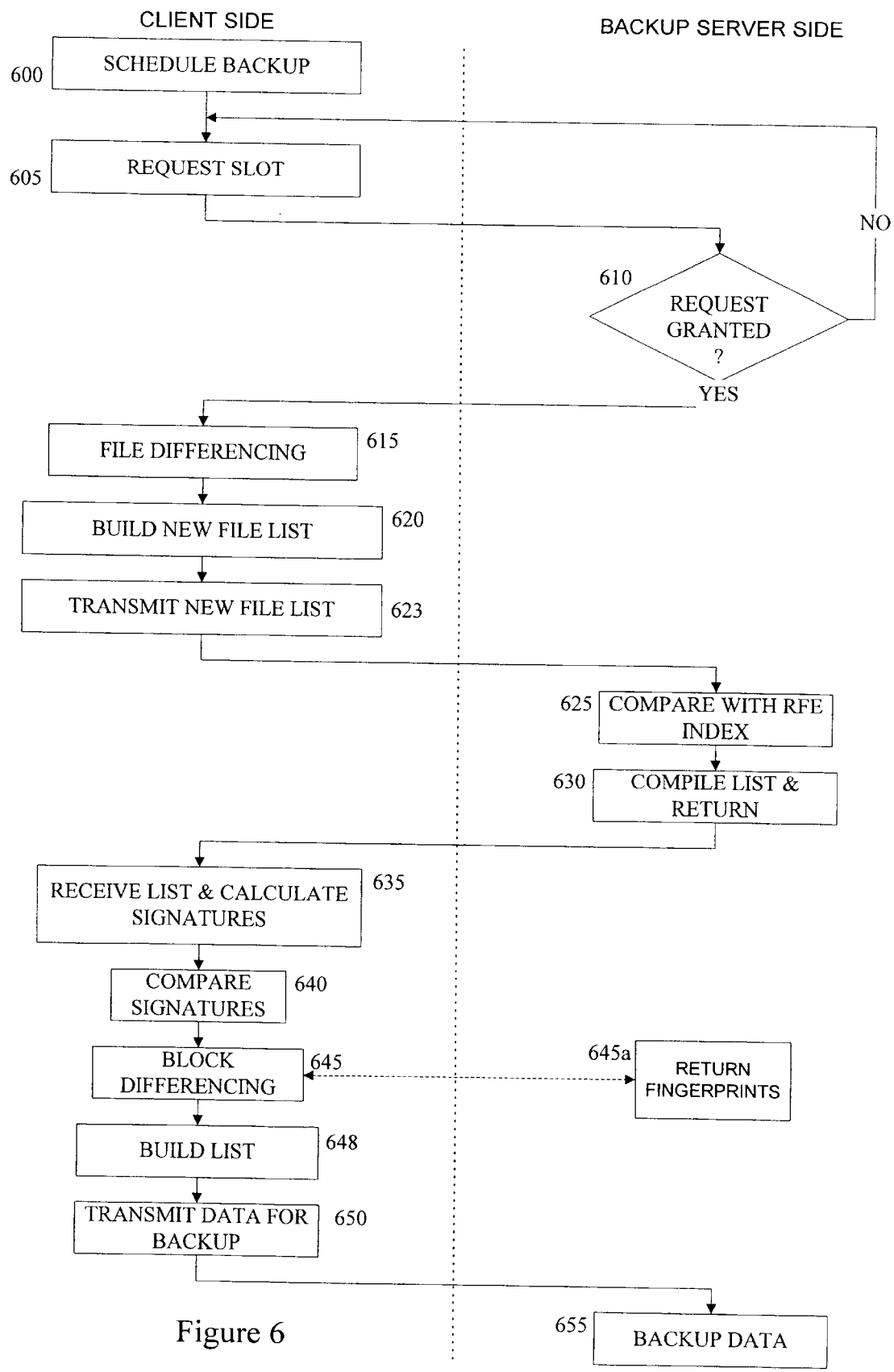
FIG. 6 is a flow diagram representing a backup operation according to the present exemplary embodiment.

A basic backup operation from the client 210*a* to the backup apparatus 240 will now be described with reference to the flow diagram in FIG. 6, which splits client side and tape backup apparatus side operations.

For the backup agent 215*a*, the dynamic scheduler 310 schedules a backup operation, in step 600, on the basis of the time lapsed since the last backup and/or the amount of new data, client loading, and/or network loading. When the criteria for the backup operation are met, the dynamic scheduler 310 issues a request, in step 605, to the backup apparatus 240 for a backup slot. The backup apparatus 240 receives the request, and the backup scheduler 500 checks the tape backup apparatus loading and network loading, in step 610, and accepts or rejects the request. If rejected, the dynamic scheduler 310 makes further requests until a request is accepted.

Once a request is accepted by the backup apparatus 240, in step 615 the FDM 330 compiles from all the files stored on the client 210*a* a first list of files that have been amended or added since the client was last backed up.

By way of example, assume that the client 210*a* only stores five files. The statuses of the five exemplary files stored by the client 210*a* are illustrated in FIG. 7*a*. Obviously, in practice, the number of files will be much larger.

As shown in FIG. 7*a*, File 1 and File 2 are modified files, where File 1 has modified blocks 3 and 7 and a respective modified date and time stamp, and File 2 has a modified block 5 and a respective modified date and time stamp. These modified files have already been backed up at least once. The modified portions of the files are highlighted in the diagram using thick lines. References to the modified blocks are stored in the FDA log 347. File 3 is an existing file, which has not been modified since the last backup, and File 4 and File 5 are new files. As shown, File 4 is a 'common' file, which has an exact copy already on the file server 240 for another client, and File 5 is a 'unique' file, which is new to both the client 210*a* and to the backup apparatus 240. Although the statuses of the new files are shown in FIG. 7*a*, this is purely for ease of explanation herein and it will be appreciated that in practice the client 210*a* has no advance information about whether the backup apparatus 240 already contains versions of new files.

The first list, although not specifically shown, includes all files illustrated in FIG. 7*a* except File 3, since File 3 has not been modified. Having built the first list, in step 620 the FDM 330 compiles a second file list for new files, including File 4 and File 5, as illustrated in FIG. 7*b*. As shown, the second list contains for each file only a respective 4-byte CRC (calculated over the name, date/time stamp and file size information). The second list, comprising CRCs, is then transmitted to the backup apparatus 240 in step 623. The 4-byte amount of information per file minimises the network bandwidth required to send the information to the backup apparatus 240, while at the same time providing enough information for comparison purposes.

The backup apparatus 240 receives the request, in step 625, and the RFE module 510 compares the second file list with the entries in the RFE index 512 to find 0 matching files which are already stored on the backup apparatus 240.

An exemplary RFE index is illustrated in FIG. 8. The RFE index 512 in FIG. 8 includes entries for three clients: Client 110*a*, Client 110*b* and Client 110*n*. Also shown is a representation of the tape backup apparatus on-line storage 242, representing the arrangement of files stored therein in very simple terms, for ease of understanding only (that is, the construction of files in the on-line storage 242 is not shown in terms of DTFs and BDFs). FIG. 8 also shows the association between each file reference in the RFE index 512 with the files stored in the on-line storage, 242, although it will be appreciated that there is no physical association, such as pointers, stored by the RFE index 512.

In this case, File 4 is a common file (in this example, it was initially stored for Client 110*n*), and File 1 is also shown as being a common file (in this example, it was initially stored for Client 110*b*). There is only one entry for each common file in the RFE index 512, where the entry is associated with the first client which introduced the file to the backup apparatus 240.

Returning to the flow diagram, in step 630, the RFE module 510 compiles and returns a third list of files, and respective signatures and pointers, for the files that have RFE index entries, as shown in FIG. 7*c*. Thus, File 4 only is included in the third list, where File 5, being a unique file, is ignored.

The backup agent 215*a* receives the third list, in step 635, and the BDM 340 calculates a signature for each file stored on the client 210*a* which appears in the list. In step 640 the calculated signatures are compared with the respective received signatures (in this case there is only one calculated and one received signature for File 4) to confirm which files are already stored on the backup apparatus 240 (i.e. which files are redundant), and thus do not need backing up.

Next, for each modified file (File 1 and File 2), the BDM 340 determines which specific parts of the files are different, in step 645. For this operation, the BDM 340 communicates with the backup apparatus 240 to retrieve the respective fingerprint information, as illustrated by step 645*a*.

In step 648, the DTM 350 builds a fourth list, as illustrated in FIG. 7*d*, which shows File1, File 2, File 4 and File 5. This list comprises at least some information for all new and modified files. The data included with each entry in the fourth list are:—file name; modified date/time stamp; file differences (for modified files) or entire file data (for new and non-redundant files); signature; and pointer (if the file is a new, redundant file, the pointer is included to indicate where on the backup apparatus 240 the file is already located).

Then, in step 650, the DTM 350 transmits the fourth list, as a backup data stream to be backup up to the backup apparatus 240.

Finally, in step 655, the BSM 520 receives the data and arranges and stores the data in the backup apparatus 240.

The above-described process outlines the steps required for a simple backup operation according to the present embodiment. The process can be varied or improved upon without moving away from the scope or the essence of the present invention. For example, more complex RFE procedures may be applied to cope with partial file redundancy, where the tape backup apparatus recognises that new files from one client are only slightly different from existing backed up files. As a result, only the differences between the new files and the already-stored files need to be backed up.

Figure 9:
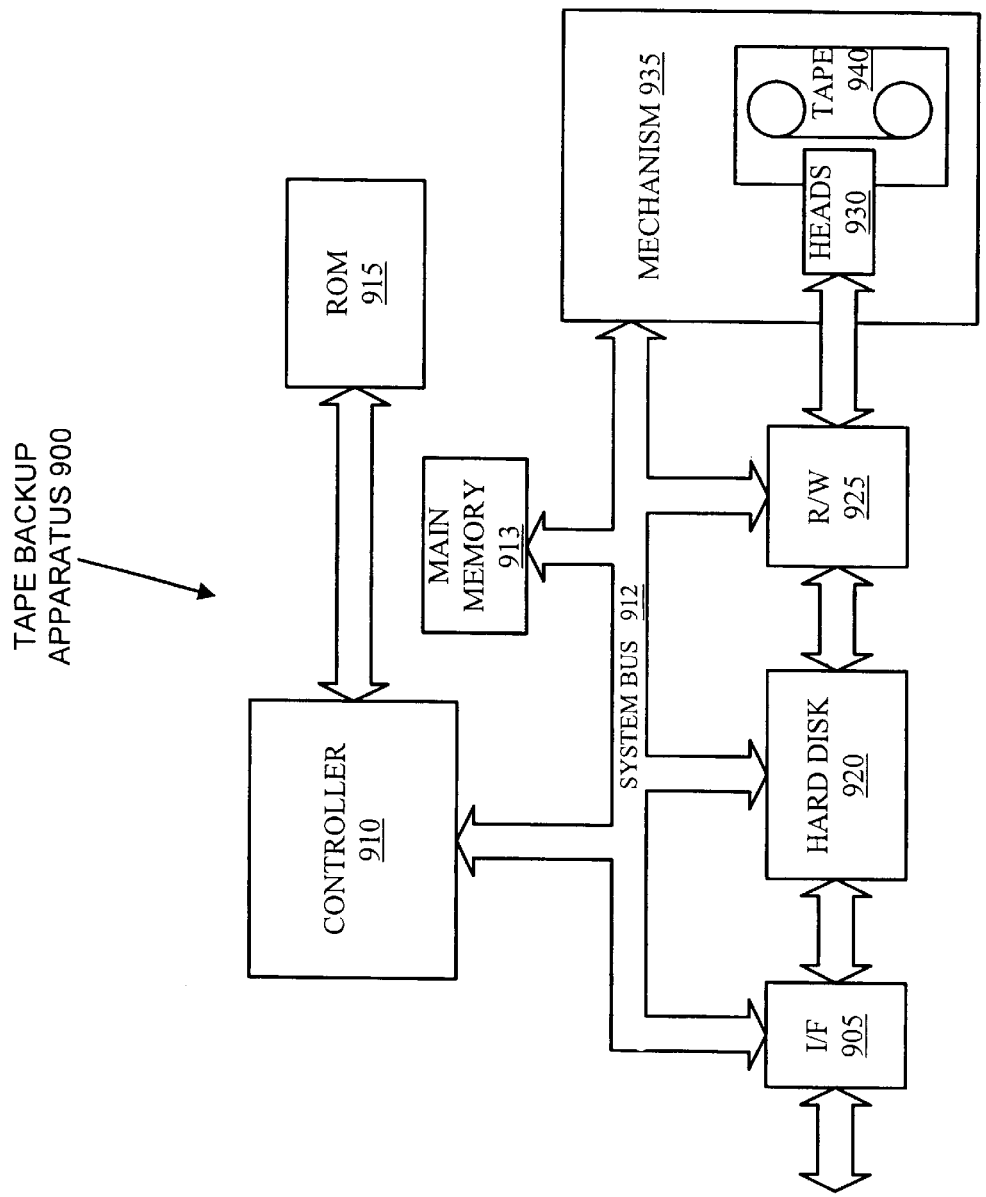
FIG. 9 is a block diagram of backup apparatus according to an embodiment of the present invention.

The diagram in FIG. 9 is a block diagram which illustrates the components of an exemplary tape backup apparatus according to the present invention.

In FIG. 9, the tape backup apparatus is referenced 900 and includes a interface 905 for transmitting data between the tape backup apparatus 900 and one or more clients (not shown). The interface 905 may comprise, for example, a local area network adapter, if the apparatus is configured to be attached directly to a network, or a SCSI (small computer system interface) adapter, if the apparatus is configured to be attached directly to a computer. Thus, one or more clients can address the tape backup apparatus either directly across the network or via the computer.

In the tape backup apparatus 900 a controller 910 controls the operation of all components of the backup apparatus 900, is responsible for processing messages received from clients and is responsible for managing the data movement within the apparatus, for example between hard disk drive device 920 and tape 940. The controller communicates with the other components of the apparatus via a system bus 912. The controller 150 typically comprises a microprocessor, for example a Motorola 68000 series microprocessor or an Intel 80386 microprocessor. The operation of the controller is determined by a program comprising firmware instructions stored in ROM 915. Main memory 913 comprising RAM is accessible by the controller 910 via the system bus 912.

The hard disk drive device 920 is connected to the interface 905 such that it can receive or send client data from or to the interface 905. In a particularly preferred embodiment, the tape backup apparatus 900 includes further functionality to compress data before storing it on the hard disk drive device 920, thereby reducing the storage capacity requirement thereof. Many well-known compression algorithms may be used, for example a Lempel-Ziv substitution algorithm.

A read/write processor 925 is connected to the hard disk drive device 920. The read/write processor 925 is arranged to receive data from the hard disk drive device 920 and convert it into a form suitable for driving read/write heads 930 of a tape mechanism 935 for storage of the data to tape media 940, or to receive data from the tape media 940 and convert it into a form suitable for storage on the hard disk drive device 920. Additionally, the read/write processor 925 includes error correction/detection functionality, which uses, for example, Reed-Solomon encoding, which is well-known in the data storage art. The tape media 940 is mounted in the tape mechanism 935, which loads and ejects the tape media 940, winds the tape media forwards or backwards as required and actuates the read/write heads 930 as appropriate. For example, the tape heads may be mounted on a rotating drum, which rotates at an oblique angle to the travel of the tape, such as in a well-known DDS (Digital Data Storage) tape drive. Alternatively, the tape heads may be mounted for perpendicular movement in relation to the travel of the tape, such as in digital linear tape recording technology.

The interface 905 and read/write processor typically each comprise one or more appropriately programmed application-specific integrated circuits (ASICs).

The components of the tape backup apparatus in its preferred embodiment are housed in a single housing (not shown) for convenience, thereby providing a dedicated data backup and restore apparatus and solution. The apparatus can be thought of as a novel tape drive comprising extra functionality and a large, non-volatile data storage facility. In practice, the non-volatile storage must have a capacity equal to or, most preferably, greater than the capacity of the combined local storage of all clients using the apparatus as a backup solution. Equally, the tape storage capacity of the apparatus must be equal to or greater than that of the non-volatile storage. In both cases, the storage capacity would need to take into consideration any data compression that is being implemented.

The dedicated data backup and restore apparatus can be configured by a system administrator, for example for the purposes of setting the daily time for backup of data from the hard disk drive device to tape, by logging on to the tape backup apparatus administration interface via a remote workstation console and configuring the apparatus using an appropriate user interface.

There is no reason in practice why the components of the apparatus could not be arranged in a more distributed manner. For example, the controller could be embodied as a standard computer system, such as a PC, running appropriate software. The PC would then need to support appropriate hardware devices (hard disk drive device and tape drive). In this way, a similar but non-dedicated solution could be achieved, in a far less convenient manner. In particular, in a distributed solution each component would need to be individually added to the PC and configured, and great care would need to be taken whenever further components or devices were added to the PC, or the PC's configuration was changed.

In future embodiments of the invention, the applicants envisage that the hard disk drive device 920 may be replaced by an alternative, such as a solid state device. An example would be NV-RAM (non-volativel RAM), which presently can comprise SRAM (static RAM) with its own power supply (e.g. a battery), or EEPROM (electrically erasable programmable ROM). Such alternatives would currently be technically possible, but, it is believed, not financially viable. Additionally, the tape media may be replaced by an alternative removable media, for example, an appropriate NV-RAM technology.

Other variations and improvements will become apparent to the skilled person on reading the present description.

What is claimed is:

1. Apparatus for backing up a network of client computers to a disaster recovery memory and for recovering backed up signals from the disaster recovery memory to the client computers, the apparatus comprising a random access nonvolatile backup memory, the nonvolatile memory being arranged to store signals in a format different from the recovery memory signal storage format; an interface adapted to be coupled to the network for coupling signals to be backed up from the client computers to the nonvolatile memory and for coupling backed up signals from the nonvolatile memory to the client computers via the network; a converter arrangement adapted to be coupled to the recovery memory and coupled with the nonvolatile memory for converting signals in the format of the nonvolatile memory to the format of the recovery memory and for converting signals in the format of the recovery memory to the format of the nonvolatile memory; and a controller arrangement for supplying control signals to (a) the interface, (b) the nonvolatile memory, (c) the recovery memory and (d) the converter arrangement for causing (a) backup of the client computers to the nonvolatile memory from the network via the interface, (b) backup of the client computers to the recovery memory by, from time to time, supplying an image of the backup in the nonvolatile memory from the nonvolatile memory to the recovery memory via the converter, (c) backup recovery from the recovery memory to one of the client computers by supplying an image of the backup for said one client computer in the recovery memory to said one client computer via the converter, nonvolatile memory, interface and network, and (d) backup recovery from the nonvolatile memory to a selected client computer by supplying an image of the backup for said selected client computer to the selected client computer from the nonvolatile memory to the selected client computer via the interface and network.

2. The apparatus of claim 1 wherein the controller arrangement is arranged to cause the backup of the client computers to the nonvolatile and recovery memories such that the nonvolatile and recovery memories (a) do not store redundant files of the client computers, (b) store files of the client computers only in compressed data form, and (c) store only incremental backup data from the client computers after the nonvolatile memory has stored in a baseline a full backup of the client computers.

3. The apparatus of claim 2 wherein the recovery memory is removable from the apparatus and the controller is arranged to cause (a) backup of the client computers from the nonvolatile memory to the recovery memory to be completed at a predetermined time during a day, and (b) start the backup of the client computers to the recovery memory at a variable time determined by (i) the predetermined time, (ii) the amount of incremental data to be backed up from the nonvolatile memory to the recovery memory, and (iii) the data transfer rate from the nonvolatile memory to the recovery memory.

4. The apparatus of claim 1 wherein the recovery memory is removable from the apparatus and the controller is arranged to cause (a) backup of the client computers from the nonvolatile memory to the recovery memory to be completed at a predetermined time during a day, and (b) start the backup of the client computers to the recovery memory at a variable time determined by (i) the predetermined time, (ii) the amount of data to be backed up from the nonvolatile memory to the recovery memory, and (iii) the data transfer rate from the nonvolatile memory to the recovery memory.

5. The apparatus of claim 1 wherein the controller is arranged for receiving from a client via the network and the interface a backup request message and for responding that the request can not be sent in response to loading by the apparatus and the network exceeding respective predetermined limits.

6. The apparatus of claim 1 wherein the controller is arranged to respond to a request message received from a client via the network and the interface, the request message requesting a restoration to that client of particular data, the controller being arranged for combining respective incremental and baseline data stored in the nonvolatile memory to form the particular data and cause it to be sent back to that client via the interface and the network.

7. The apparatus of claim 6 wherein the request message from the client requests restoration of particular data that are not the most recent version thereof backed up by the client, the controller being arranged for causing data stored in the nonvolatile memory and recovery memory to be combined so the respective incremental data and baseline data form the particular data.

8. Apparatus for backing up a network of client computers to a disaster recovery memory, comprising a random access nonvolatile backup memory; an interface adapted to be coupled to the network for coupling signals to be backed up from the client computers to the nonvolatile memory; circuitry adapted to be coupled to the recovery memory and coupled with the nonvolatile memory for coupling signals from the nonvolatile memory to the recovery memory; and a controller arrangement for supplying control signals to (a) the interface, (b) the nonvolatile memory, and (c) the recovery memory for causing (a) backup of the client computers to the nonvolatile memory from the network via the interface, and (b) backup of the client computers to the recovery memory by, from time to time, supplying an image of the backup in the nonvolatile memory from the nonvolatile memory to the recovery memory, the controller arrangement being arranged to cause the backup of the client computers to the nonvolatile and recovery memories such that the nonvolatile and recovery memories (a) do not store redundant files of the client computers, (b) store files of the client computers only in compressed data form, and (c) store only incremental backup data from the client computers after the nonvolatile memory has stored in a baseline a full backup of the client computers.

9. The apparatus as claimed in claim 8 wherein the controller includes a merge control for, from time to time, merging the incremental backup data supplied by the client computers to the nonvolatile memory.

10. The apparatus as claimed in claim 8 wherein the controller is arranged to delete from the nonvolatile memory backed up files from the baseline full backup in response to a file being deleted from a client computer and in response to the backed up data file being stored in the nonvolatile memory for more than a predetermined interval.

11. Apparatus for backing up a network of client computers, comprising a random access nonvolatile backup memory; a disaster recovery memory; and an arrangement for coupling signals to be backed up from the client computers to the nonvolatile memory and the recovery memory and for causing the coupled signals to be such that the nonvolatile and recovery memories (a) do not store redundant files of the client computers, (b) store files of the client computers only in compressed data form, and (c) store only incremental backup data from the client computers after the nonvolatile and recovery memories have stored in a baseline a full backup of the client computers.

12. A method of backing up a network of client computers to a disaster recovery memory and a nonvolatile memory and of recovering backed up signals from the recovery memory and the nonvolatile memory to the client computers; the method comprising coupling signals to be backed up from the client computers to the nonvolatile memory; coupling recovered backed up signals from the nonvolatile memory to the client computers; the coupling steps between the client computers and the nonvolatile memory being via the network; backing up the client computers to the recovery memory by supplying an image of the backup in the nonvolatile memory from the nonvolatile memory to the recovery memory; recovering backup from the recovery memory to one of the client computers by supplying an image of the backup for said one client computer in the recovery memory to said one client computer via the nonvolatile memory and network; and recovering backup from the nonvolatile memory to a selected client computer by supplying an image of the backup for said selected client computer to the selected client computer from the nonvolatile memory to the selected client computer via the network.

13. The method of claim 12 further including causing backup of the client computers to the nonvolatile and recovery memories such that the nonvolatile and recovery memories (a) do not store redundant files of the client computers, (b) store files of the client computers only in compressed data form, and (c) store only incremental backup data from the client computers after the nonvolatile memory has stored in a baseline a full backup of the client computers.

14. The method of claim 13 further comprising (a) removing the recovery memory from a site where the nonvolatile memory is located at a predetermined time of a day, and (b) starting the backup of the client computers to the recovery memory at a variable time determined by (i) the predetermined time, (ii) the amount of incremental data to be backed up from the nonvolatile memory to the recovery memory, and (iii) the data transfer rate from the nonvolatile memory to the recovery memory.

15. The method of claim 12 further including backup of the client computers to the nonvolatile memory such that the nonvolatile memory (a) does not store redundant files of the client computers, (b) stores files of the client computers only in compressed data form, and (c) stores only incremental backup data from the client computers after the nonvolatile memory has stored in a baseline a full backup of the client computers.

16. A method of backing up a network of client computers to a disaster recovery memory and a nonvolatile memory; the method comprising: coupling signals to be backed up from the client computers to the nonvolatile memory; coupling backed up signals from the nonvolatile memory to the client computers; backing up the client computers to the nonvolatile memory via the network; and backing up the client computers to the recovery memory by supplying an image of the backup in the nonvolatile memory from the nonvolatile memory to the recovery memory, and causing the backup of the client computers to the nonvolatile and recovery memories such that the nonvolatile and recovery memories (a) do not store redundant files of the client computers, (b) store files of the client computers only in compressed data form, and (c) store only incremental backup data from the client computers after the nonvolatile memory has stored a baseline full backup of the client computers.

17. The method as claimed in claim 16 further including merging the incremental backup data supplied by the client computers to the nonvolatile memory.

18. The method as claimed in claim 16 further including deleting from the nonvolatile memory backed up files from the baseline full backup in response to a file being deleted from a client computer and in response to the backed up data file being stored in the nonvolatile memory for more than a predetermined interval.

19. The method of claim 16 further comprising (a) removing the recovery memory from a site where the nonvolatile memory is located at a predetermined daily time, and (b) starting the backup of the client computers to the recovery memory at a variable daily time determined by (i) the predetermined daily time, (ii) the amount of incremental data to be backed up from the nonvolatile memory to the recovery memory, and (iii) the data transfer rate from the nonvolatile memory to the recovery memory.

20. A method of backing up a network of client computers, comprising coupling signals to be backed up from the client computers to a nonvolatile memory and a recovery memory, and causing the signals coupled to the nonvolatile and recovery memories to be such that the nonvolatile and recovery memories (a) do not store redundant files of the client computers, (b) store files of the client computers only in compressed data form, and (c) store only incremental backup data from the client computers after the nonvolatile and recovery memories have stored in a baseline a full backup of the client computers.

21. A memory storing a program for causing a computer to execute the method of claim 12.

22. A memory storing a program for causing a computer to execute the method of claim 13.

23. A memory storing a program for causing a computer to execute the method of claim 14.

24. A memory storing a program for causing a computer to execute the method of claim 15.

25. A memory storing a program for causing a computer to execute the method of claim 16.

26. A memory storing a program for causing a computer to execute the method of claim 17.

27. A memory storing a program for causing a computer to execute the method of claim 18.

28. A memory storing a program for causing a computer to execute the method of claim 19.

29. A memory storing a program for causing a computer to execute the method of claim 20.

* * * * *